US006728924B1

(12) United States Patent
Lou et al.

(10) Patent No.: US 6,728,924 B1
(45) Date of Patent: Apr. 27, 2004

(54) PACKET LOSS CONTROL METHOD FOR REAL-TIME MULTIMEDIA COMMUNICATIONS

(75) Inventors: Hui-Ling Lou, Murray Hill, NJ (US); Carl-Erik Wilhelm Sundberg, Chatham, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/425,143

(22) Filed: Oct. 21, 1999

(51) Int. Cl.[7] .............................................. H03M 13/00

(52) U.S. Cl. ....................................... 714/776; 714/713

(58) Field of Search .......................... 370/60, 82, 94.1, 370/80, 464, 347, 348; 714/747, 800, 781, 776, 748, 713, 751, 752, 774, 761; 710/30

(56) References Cited

U.S. PATENT DOCUMENTS

| | | | | |
|---|---|---|---|---|
| 4,761,778 A | * | 8/1988 | Hui | 370/349 |
| 5,115,431 A | * | 5/1992 | Williams et al. | 370/394 |
| 5,572,521 A | * | 11/1996 | Pauwels et al. | 370/412 |
| 5,870,412 A | | 2/1999 | Schuster et al. | 371/37.01 |
| 6,198,734 B1 | * | 3/2001 | Edwards et al. | 370/347 |

OTHER PUBLICATIONS

U.S. patent application Ser. No. 08/892,855, Urbanke et al., filed Jul. 15, 1997.

U.S. patent application Ser. No. 09/288,833, Lou et al., filed Apr. 8, 1999.

U.S. patent application Ser. No. 09/280,280, Lou et al., filed Mar. 29, 1999.

E. Ayanoglu et al., "Diversity Coding for Transparent Self–Healing and Fault–Tolerant Communication Networks," IEEE Trans. on Communications, vol. 41, No. 11, pp. 1677–1685, Nov. 1993.

A. Said and W. A. Pearlman, "A New Fast and Efficient Image Codec Based on Set Partitioning in Hierarchical Trees," IEEE Trans. on Circuits and Systems for Video Technology, vol. 6, Jun. 1996.

* cited by examiner

*Primary Examiner*—Albert Decady
*Assistant Examiner*—Mujtaba Chaudry
(74) *Attorney, Agent, or Firm*—Kenneth M. Brown

(57) ABSTRACT

A method for providing packet loss recovery in a data packet-based network used for real-time multimedia communications. In accordance with a first illustrative embodiment of the present invention, the information payload associated with a given data packet k is identically copied and appended to data packet k+w (i.e., the information payload is repeated with a delay of w transmitted packets). More generally, the present invention provides a method of coding a sequence of data packets representing a contiguous stream of information, with each data packet comprising, a set of payload information representative of a segment of the stream of information corresponding thereto. The method comprises the steps of coding a first data packet for transmission (wherein the encoded first data packet comprises a first set of payload information representative of a first segment of the stream of information), and coding a second data packet subsequence to the first data packet in the sequence for transmission (wherein the encoded second data packet comprises a second set of payload information representative of a second segment of the stream of information subsequent to the first segment of the stream of information). The encoded second data packet further comprises an additional set of payload information, the additional set of payload information also representative of the first segment of the stream of information, but not representative of other segments of the stream of information.

22 Claims, 4 Drawing Sheets

TRANSMITTED PACKET NUMBER

| | 21 | 22 | 23 |
|---|---|---|---|
| $k-w$ | | | |
| ⋮ | | | |
| $k$ | CONTROL INFORMATION | $d_k$ | $d_{k-w}$ |
| ⋮ | 24 | 25 | 22 |
| $k+w$ | CONTROL INFORMATION | $d_{k+w}$ | $d_k$ |

FIG. 6

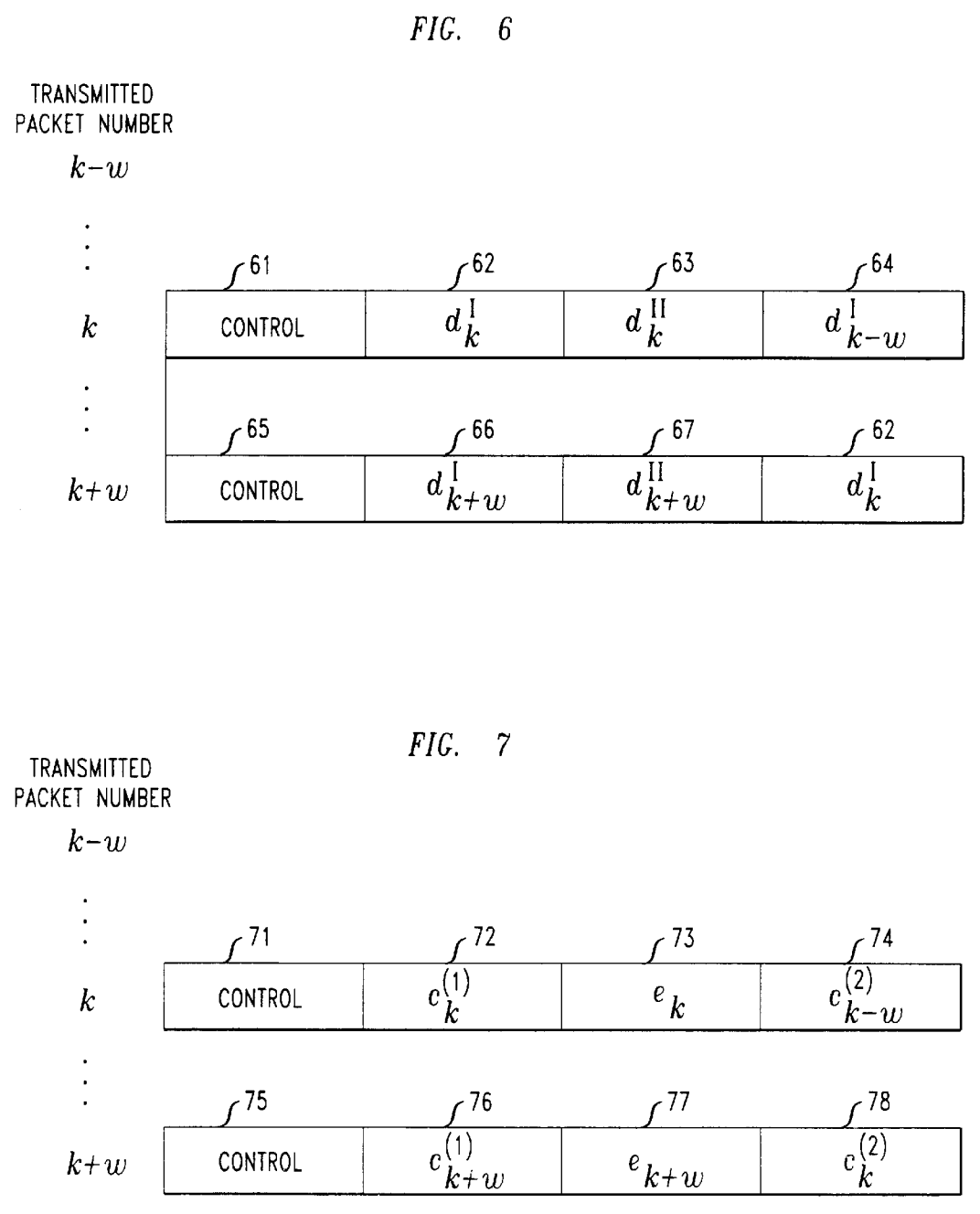

TRANSMITTED PACKET NUMBER

| | 61 | 62 | 63 | 64 |
|---|---|---|---|---|
| $k-w$ | | | | |
| $k$ | CONTROL | $d_k^{I}$ | $d_k^{II}$ | $d_{k-w}^{I}$ |
| | 65 | 66 | 67 | 62 |
| $k+w$ | CONTROL | $d_{k+w}^{I}$ | $d_{k+w}^{II}$ | $d_k^{I}$ |

FIG. 7

TRANSMITTED PACKET NUMBER

| | 71 | 72 | 73 | 74 |
|---|---|---|---|---|
| $k-w$ | | | | |
| $k$ | CONTROL | $c_k^{(1)}$ | $e_k$ | $c_{k-w}^{(2)}$ |
| | 75 | 76 | 77 | 78 |
| $k+w$ | CONTROL | $c_{k+w}^{(1)}$ | $e_{k+w}$ | $c_k^{(2)}$ |

PACKET LOSS CONTROL METHOD FOR REAL-TIME MULTIMEDIA COMMUNICATIONS

FIELD OF THE INVENTION

The present invention relates generally to the field of error correcting codes for data transmission and more particularly to a packet loss recovery technique for use in data packet-based networks providing real-time multimedia communications.

BACKGROUND OF THE INVENTION

One of the most significant issues that must be dealt with in data packet-based communications networks such as, for example, the Internet, is the problem of error correction due to packet loss. Since each data packet is transmitted through the network independently (and potentially via entirely different network routes), it is common for a destination location to fail to receive an occasional sequence of one or more data packets, and to receive some such packets after an atypically substantial delay. And when such a network is employed to provide real-time multimedia communications such as, for example, voice communications, receiving some data packets after a substantial delay may be tantamount to not receiving them at all, since the receiver cannot typically wait to proceed with the processing of subsequent data packets.

A number of techniques, invariably involving some sort of redundancy coding, have been employed to address the general problem of error correction including the packet loss problem. Typically, the packet loss channel is recognized as an erasure channel using a channel coding language. Classical error correcting codes such as binary block codes and Reed Solomon codes, each familiar to those of ordinary skill in the art, can then be employed in an erasure correcting mode. (See, e.g., E. Ayanoglu et al., "Diversity Coding for Transparent Self-Healing and Fault-Tolerant Communication Networks," IEEE Transactions on Communications, vol. 41, no. 11, pp. 1677–1685, November, 1993; and R. Urbanke el al., "Methods and Apparatus for Packetizing Data for Transmission Through an Erasure Broadcast Channel," copending U.S. patent application, Ser. No. 08/892855, filed Jul. 15, 1997 and assigned to the assignee of the present invention. U.S. patent application, Ser. No. 08/892855 is hereby incorporated by reference as is fully set forth herein.) However, it is in fact considerably simpler to correct an erasure than to correct other types of errors (such as, for example, "random" modifications of one or more symbols). In the case of an error, the location of the error must first be determined, while in the case of an erasure (e.g., an unreceived data packet), the location is known.

Typically, a random error correcting code can correct about twice as many erasures as errors in a given block. However, in the context of a transmission of a sequence of data packets across a network, a packet loss effectively causes a continuous string (a "burst") of erased symbols. Since most classical channel codes are designed for the correction of random errors (or random erasures), prior art approaches to dealing with the packet loss problem typically perform some form of interleaving (permuting) on a relatively long sequence of packets. In this manner, a packet loss channel with correlated erasures (i.e., a continuous string of erased symbols) is transformed into an apparently random erasure channel. Unfortunately, performing such an interleaving process necessarily results in a significant delay at the destination, since the decoder must de-interleave the received data in order to recreate the original sequence of data packets.

Therefore, the use of channel codes such as, for example, Reed Solomon codes, when effectively applied across many packets in sequence, will necessarily require that relatively long delays be incurred at the receiver. As pointed out above, however, such delays may be prohibitive for real-time applications such as, for example, voice communication over networks based on the Internet protocol (IP). Recently, however, in U.S. Pat. No. 5.870,412 ("Forward Error Correction System for Packet Based Real Time Media") issued to G. M. Schuster et al. on Feb. 9, 1999 (hereinafter, "Schuster et al."), a method for data recovery in a bursty packet network which incurs a relatively short delay (as compared to other prior art techniques) has been presented.

Specifically, Shuster et al. performs forward error correction by appending checksum information to each data packet, wherein the checksum information is defined by taking a bit-by-bit exclusive-or sum of the information portion (the "payload") from a preceding specified number of data packets. (Bit padding on the shorter payloads is used if the information payloads from the preceding packets are of unequal length.) By way of illustration, FIG. 1 shows a conceptual organization of a transmitted data packet in accordance with certain prior art packet loss recovery techniques, such as that employed in Shuster et al. The illustrated data packet comprises control information 11 followed by associated payload information 12. The payload information comprises the actual data which is to be communicated across the network with use of the particular packet. In addition, and in accordance with the illustrative prior art techniques such as Shuster et al., checksum information 13 is appended to the data packet for purposes of error correction. As described above, in the case of the Shuster et al. technique, the checksum information specifically comprises an exclusive-or sum of the information payload from a preceding specified plural number of data packets.

Thus, using the Shuster et al. technique, a single bit erasure correction code of length w+1 packet instances is formed, enabling for the correction of a burst of up to w lost data packets (provided such a burst is followed by a string of w correctly received data packets), with a maximum decoding delay of 2w packets. Clearly, the Shuster et al. method incurs an overhead in bit volume of at least 100% (more if bit padding is required), as compared to the bits of the information payloads alone. In addition, it can be seen that the method of Shuster et al. requires the solution of w exclusive-or equations.

SUMMARY OF THE INVENTION

We have recognized that a significant improvement over the scheme of Shuster et al. may be realized by foregoing the prior art's approach of generating checksum information by "combining" (e.g., by performing exclusive-or operations) the payload information from a plurality of preceding data packets, and rather, simply "repeating" information content from a particular one of the previous data packets. For example, and in accordance with a first illustrative embodiment of the present invention, the information payload associated with a given data packet k is identically copied and appended to data packet k+w. That is, the information payload is repeated with a delay of w transmitted packets. Such an approach can advantageously correct for a burst of up to w lost data packets (as does the prior art method of Shuster el al.), but no complex mathematical operations (such as the exclusive-or operations required by Shuster el al.) need to be performed. Moreover, and most importantly, the illustrative method of the present invention improves the decoding window (i.e., the maximum decoding delay) to w+l packets (as compared to the 2w packet decoding window required by the method of Shuster et al.

In accordance with one illustrative embodiment of the present invention, the value of the parameter w may be advantageously selected based on any desired "burst" error (i.e. the number of consecutive lost packets) correction capability, in combination with a corresponding desired "decoding window" (i.e., the maximum decoding delay), since the setting of parameter w clearly results in a direct tradeoff between these two factors. In accordance with another illustrative embodiment of the present invention, the value of the parameter w may be set or adjusted dynamically based on network feedback information.

Specifically, the present invention provides a method of coding a sequence of data packets representing a continuous stream of information, with each data packet comprising a set of payload information representative of a segment of the stream of information corresponding thereto. The method comprises the steps of coding a first data packet for transmission (wherein the encoded first data packet comprises a first set of payload information representative of a first segment of the stream of information), and coding a second data packet subsequent to the first data packet in the sequence for transmission (wherein the encoded second data packet comprises a second set of payload information representative of a second segment of the stream of information subsequent to the first segment of the stream of information). The encoded second data packet further comprises an additional set of payload information, the additional set of payload information also representative of the first segment of the stream of information, but not representative of other segments of the stream of information.

BRIEF DESCRIPTION OF THE DRAWINGS

FIG. 6 shows an illustrative sequence of transmitted data packets in accordance with a third illustrative embodiment of the present invention in which payload information is classified into two classes depending on error sensitivity.

FIG. 7 shows an illustrative sequence of transmitted data packets in accordance with a fourth illustrative embodiment of the present invention employing embedded coding techniques having separate core and enhancement coding layers.

DETAILED DESCRIPTION

A First Illustrative Embodiment

In accordance with a first illustrative embodiment of the present invention, a method for providing packet loss control in a data packet-based communications network is accomplished with use of a "duplicate and delay" technique. In particular, the payload information portion associated with each data packet k is identically copied and appended to data packet k+w, immediately following the respective payload information which is associated with packet k+w itself. Thus, each payload is sent across the network twice—once as a part of its original data packet, and again as part of the w'th following data packet. In this manner, the receiver can advantageously correct for up to w consecutive lost (or excessively delayed) data packets—the same error correction capability provided by the prior art approach of Shuster el al., without the need to perform complex mathematical operations such as exclusive-or operations in either the encoding or decoding processes. Moreover, the decoding window has been advantageously improved to w+l data packets (as compared to the 2w data packet decoding window required by Shuster et al.). Note also that no bit padding is required, even when the payload information of the various data packets are of differing lengths.

Figure 1:
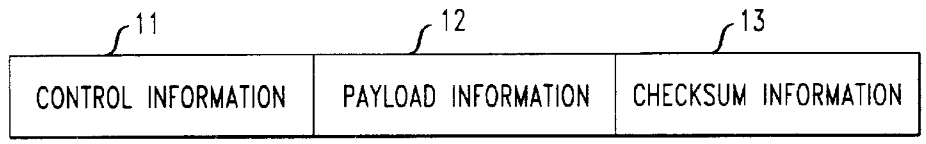
FIG. 1 shows a typical organization of a transmitted data packet in accordance with certain prior art packet loss recovery techniques.
Figure 2:
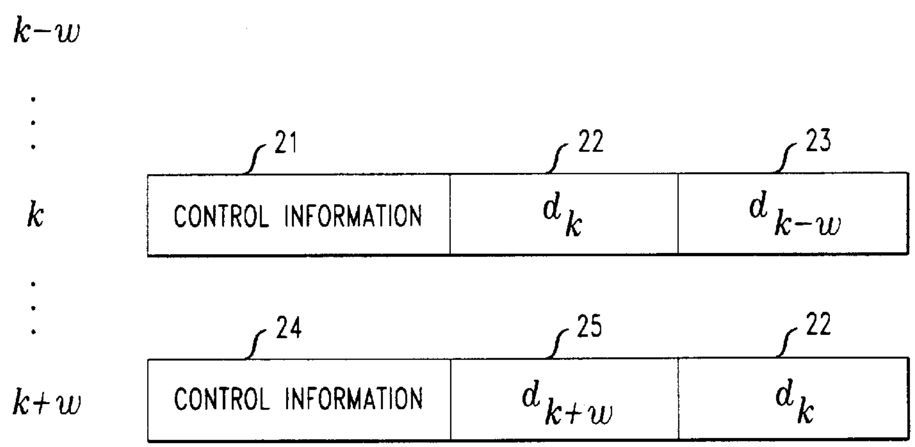
FIG. 2 shows a sequence of transmitted data packets in accordance with a first illustrative embodiment of the present invention in which copies of payload information are replicated in subsequent data packets.

FIG. 2 shows a sequence of transmitted data packets in accordance with the first illustrative embodiment of the present invention in which copies of payload information are identically duplicated and repeated in subsequent data packets. Specifically, data packets k and k+w are shown. Data packet k comprises control information 21, followed by payload information 22, which comprises data $d_k$—the actual data which is associated with the particular packet k and which is intended to be transmitted across the communications network with use thereof. In addition, however, and in accordance with the first illustrative embodiment of the present invention, (repeated) payload information 23 comprising data $d_{k-w}$, which is identical to the payload information which was associated with data packet k−w and was previously transmitted across the communications network, is appended to data packet k immediately after payload information 22. Similarly, data packet k+w comprises control information 24, followed by payload information 25, which comprises data $d_{k+w}$—the actual data which is associated with the particular packet k+w and which is intended to be transmitted across the communications network with use thereof. Again, however, and in accordance with the first illustrative embodiment of the present invention, (repeated) payload information 22 comprising data $d_k$, which is identical to the payload information which was associated with data packet k and was previously transmitted across the communications network, is appended to data packet k+w immediately after payload information 25.

Figure 3A:
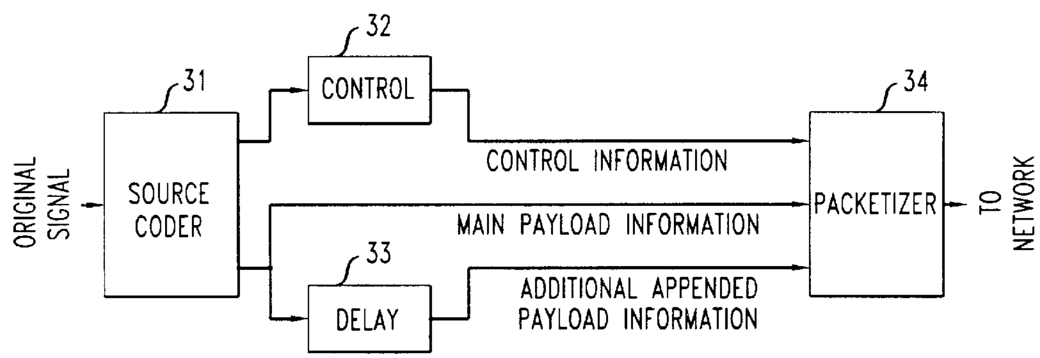
FIG. 3A shows a block diagram of an illustrative encoder/transmitter in accordance with the first illustrative embodiment of the present invention.
Figure 3B:
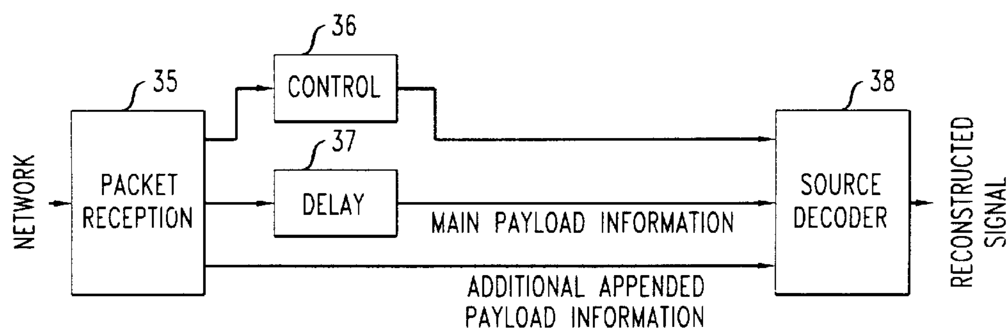
FIG. 3B shows a block diagram of an illustrative decoder/receiver in accordance with the first illustrative embodiment of the present invention.

FIG. 3 shows an illustrative transmission system which utilizes the method of the first illustrative embodiment described above. Specifically. FIG. 3A shows a block diagram of an illustrative encoder/transmitter in accordance with the first illustrative embodiment of the present invention, and FIG. 3B shows a block diagram of an illustrative decoder/receiver in accordance with the first illustrative embodiment of the present invention.

As shown in FIG. 3A, data packet encoding is performed in accordance with the first illustrative embodiment as follows. Source coder 31 produces the payload information data for transmission and to be included as the associated payload information in a given data packet. Then, packetizer 34 produces each actual data packet for transmission onto the network. Specifically, packetizer 34 combines (a) control information as Generated by control module 32; (b) the (main) payload information associated with the data packet being produced: and, in accordance with the first illustrative embodiment of the present invention, (c) additional payload information provided for purposes of packet loss recovery. In particular, the additional payload information comprises a copy of the payload information previously generated by source coder 31 for association with a particular previous data packet, the previous payload information having been delayed by being passed through delay module 33. For example, in accordance with the illustrative data packet sequence described with reference to FIG. 2 above, delay 33 advantageously passes each payload through to packetizer 34 after a delay of precisely w data packets.

As shown in FIG. 3B, data packet decoding and packet loss recovery are performed in accordance with the first illustrative embodiment as follows. Packet reception module 35 receives data packets from the network and separates each received data packet into its associated control information, the main payload information, and, in accordance with the first illustrative embodiment of the present invention, the additional payload information appended thereto. Packet reception module 35 also advantageously recognizes packet loss, which may, for example, be based on an excessive elapsed time (i.e., "timing out") since the receipt of the previous data packet in the expected sequence. The control information from packet reception 35, along with any packet loss indications is provided to control module 36, which directs source decoder 38 to decode the appropriate payload information. Specifically, the main payload information, which has been delayed by delay module 37, will be used by source decoder 38 when packet loss has not occurred for the particular data packet. Otherwise, the additional appended payload information (not delayed) will be used by source decoder 38. Again, by way of example, in accordance with the illustrative data packet sequence described with reference to FIG. 2 above, delay 37 advantageously passes each payload through to source decoder 38 after a delay of precisely w data packets.

Note that the main payload information signal and the additional appended payload information signal, as shown in the illustrative decoder/receiver of FIG. 3B, are clearly the same as the corresponding signals shown in the illustrative encoder/transmitter of FIG. 3A.

A Second Illustrative Embodiment

In accordance with a second illustrative embodiment of the present invention, multidescriptive multistream encoding techniques may be advantageously employed in connection with the principles of the present invention. Multidescriptive coding techniques, familiar to those skilled in the art, are described, for example, H-L. Lou et al., "Techniques for Effectively Communicating Multiple Digital Representations of a Signal," co-pending U.S. patent application Ser. No. 09/280280, filed Mar. 29, 1999 and assigned to the assignee of the present invention. (U.S. patent application, Ser. No. 09/280280 is hereby incorporated by reference as if fully set forth herein.) For example, for an illustrative audio signal, two "equivalent" bit streams (i.e., different descriptions of the same signal) may be created by a multidescriptive audio encoder. The principles of the present invention may then be advantageously applied by sending a first one of the two representations for a given segment of the data (i.e., from the first bit stream) as part of the "original" data packet (e.g., packet k) as the main payload information, while delaying the other one of the representations for that segment by w packets, and transmitting that other representation as an additional payload packet appended to the w'th subsequent data packet (e.g., packet k+w).

Figure 4:
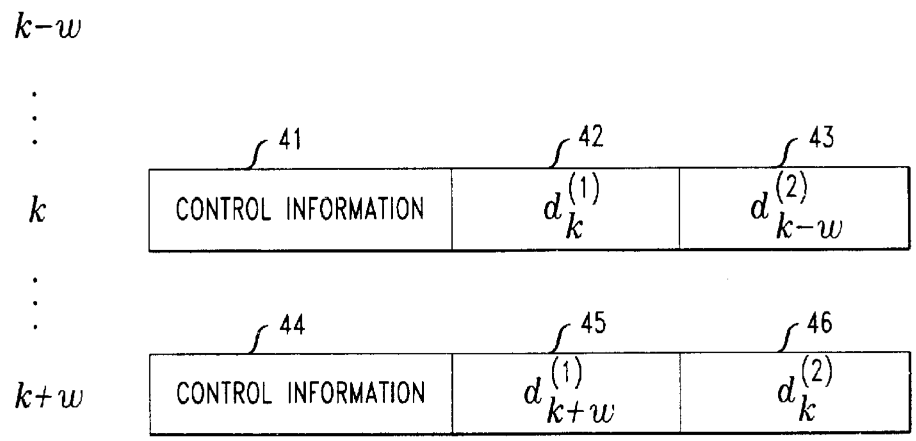
FIG. 4 shows an illustrative sequence of transmitted data packets in accordance with a second illustrative embodiment of the present invention employing multidescriptive multistream transmission.

In particular, FIG. 4 shows an illustrative sequence of transmitted data packets in accordance with the second illustrative embodiment of the present invention employing multidescriptive multistream transmission. Specifically, data packets k and k+w) are shown. Data packet k comprises control information 41, followed by payload information 42, which comprises data $d^{(1)}_k$—the data from the first of the two multidescriptive bit streams which is associated with the particular packet k and which is intended to be transmitted across the communications network with use thereof. In addition, however, and in accordance with the second illustrative embodiment of the present invention, additional payload information 43 comprising data $d^{(2)}_{k-w}$, which consists of the data from the second of the two multidescriptive bit streams associated with previously transmitted data packet k−w, is appended to data packet k immediately after payload information 42.

Similarly, data packet k+w comprises control information 44, followed by payload information 45, which comprises data $d^{(1)}_{k-w}$—the data from the first of the two multidescriptive bit streams which is associated with the particular packet k+w, and which is intended to be transmitted across the communications network with use thereof. Again, however, and in accordance with the second illustrative embodiment of the present invention, additional payload information 46 comprising data $d^{(2)}_k$, which consists of the data from the second of the two multidescriptive bit streams associated with data packet k, is appended to data packet k+w immediately after payload information 45.

With use of this second illustrative embodiment of the present invention, note that when up to w data packets are lost, the illustrative audio signal may be reproduced at the receiver from one of the two bit streams during the burst of lost packets. However, when no packets are lost (i.e., during erasure-free transmissions), the audio may be advantageously reproduced at the receiver based on both of the two bit streams. Thus, during periods of no packet loss, the second illustrative embodiment of the present invention employing multistream encoding provides superior audio quality than, for example, the prior art technique of Schuster et al. using a single audio bit stream. During periods of packet loss, however, the quality levels are the same. Thus, graceful degradation is advantageously achieved with use of the multidescriptive multistream approach in accordance with the second illustrative embodiment of the present invention. Note that when packet loss beyond the correction limit occurs, an error mitigation mode, familiar to those skilled in the art, will be employed. (See, e.g., U.S. patent application Ser. No. 09/280280, referenced above.)

Although the above discussion has been presented in the context of an audio signal, it will be obvious to one of ordinary skill in the art that the illustrative technique described may be applied equally well to any type of source signal, including, for example, speech, video, images, etc., from which a plurality of multidescriptive versions may be produced by an appropriate multidescriptive encoder. In addition, although the above description has assumed a multidescriptive encoding with exactly two bit streams, generalizations to a larger number of descriptions (i.e., bit streams) will also be obvious to one of ordinary skill in the art.

Figure 5A:
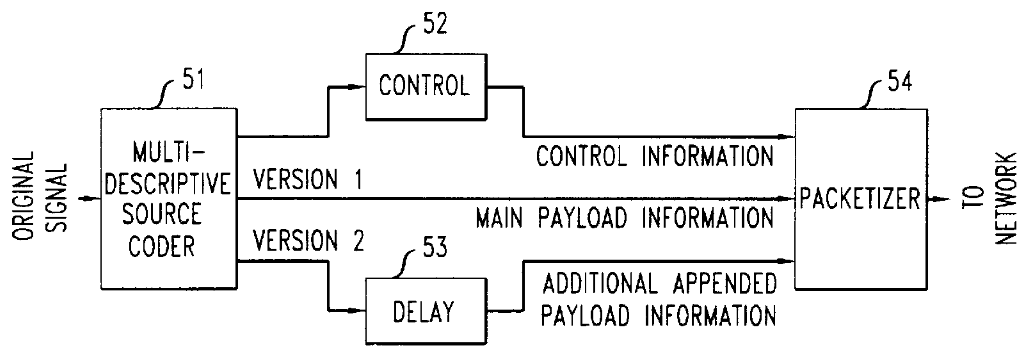
FIG. 5A shows a block diagram of an illustrative encoder/transmitter in accordance with the second illustrative embodiment of the present invention.
Figure 5B:
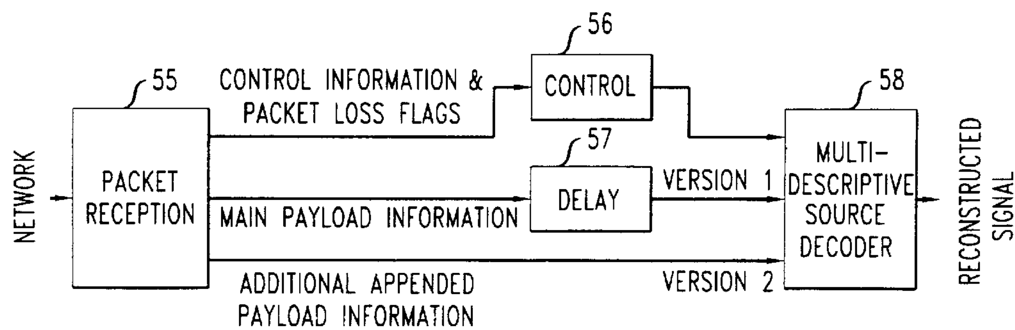
FIG. 5B shows a block diagram of an illustrative decoder/receiver in accordance with the second illustrative embodiment of the present invention.

FIG. 5 shows an illustrative transmission system which utilizes the method of the second illustrative embodiment described above. Specifically, FIG. 5A shows a block diagram of an illustrative encoder/transmitter in accordance with the second illustrative embodiment of the present invention, and FIG. 5B shows a block diagram of an illustrative decoder/receiver in accordance with the second illustrative embodiment of the present invention. The illustrative transmission system of FIG. 5 operates in a similar manner to that shown in FIG. 3 and described above, except that multidescriptive multistream coding is employed.

Specifically, as shown in FIG. 5A, data packet encoding is performed in accordance with the second illustrative embodiment as follows. Source coder 51 comprises a multidescriptive source coder which produces two independent bit streams representing different encodings of the source. Then, packetizer 54 produces each actual data packet for transmission onto the network. Packetizer 54 combines (a) control information as (venerated by control module 52; (b) the (main) payload information associated with the data packet being produced which comprises data from a first multidescriptive encoding of the source; and, in accordance with the second illustrative embodiment of the present invention, (c) additional payload information provided for purposes of packet loss recovery. In particular, the additional payload information comprises data from a second multidescriptive encoding of the source delayed, having been passed through delay module 53. For example, in accordance with the illustrative data packet sequence described with reference to FIG. 4 above, delay 53 advantageously passes each payload through to packetizer 54 after a delay of precisely w data packets.

As shown in FIG. 5B, data packet decoding and packet loss recovery are performed in accordance with the second illustrative embodiment as follows. Packet reception module 55 receives data packets from the network and separates each received data packet into its associated control information, the main payload information (comprising data from the first multidescriptive encoding of the source), and, in accordance with the second illustrative embodiment of the present invention, the additional payload information (comprising data from the second multidescriptive encoding of the source) appended thereto. Packet reception module 55 also advantageously recognizes packet loss, which may, for example, be based on an excessive elapsed time (i.e., "timing out") since the receipt of the previous data packet in the expected sequence. The control information from packet reception 55, along with any packet loss indication, is provided to control module 56, which directs source decoder 58 to decode the appropriate payload information.

Specifically, both the main payload information (comprising data from the first multidescriptive encoding (of the source), which has been delayed by delay module 57, and the additional payload information (comprising data from the second multidescriptive encoding of the source) will be used by source decoder 58 when packet loss has not occurred for the particular data packet. Thus, both of the multidescriptive bit streams may be advantageously combined to generate a high quality reconstruction of the source signal. If packet loss has occurred for the given data packet, however, only the additional appended payload information comprising data from the second multidescriptive encoding of the source (not delayed) will be used by source decoder 38 to reconstruct the given signal segment. Again, by way of example, in accordance with the illustrative data packet sequence described with reference to FIG. 4 above, delay 57 advantageously passes each payload through to source decoder 58 after a delay of precisely w data packets.

A Third Illustrative Embodiment

FIG. 6 shows an illustrative sequence of transmitted data packets in accordance with a third illustrative embodiment of the present invention in which payload information is classified into two classes depending on error sensitivity. It is well known to those of ordinary skill in the art that coding techniques may advantageously classify encoded data into two or more classes depending on error sensitivity. That is, error-free transmission of certain portions of the encoded data may be more critical to the proper reconstruction of the signal at the receiver than other portions. As such, a third illustrative embodiment of the present invention advantageously combines the principles of the present invention with such error sensitivity classification. Specifically, in accordance with the third illustrative embodiment, the most important bits of the data (referred to as the class I portion) are repeated (after the appropriate delay), while the least important bits (referred to as the class II portion) are not repeated.

With reference to FIG. 6, note that data packets k and k+w are explicitly shown. Data packet k comprises control information 61, followed by payload information 62 and 63. Payload information 62 comprises data $d^1_k$—the most important bits of the data (the class I portion) which is associated with the particular packet k and which is intended to be transmitted across the communications network with use thereof, and payload information 63 comprises data $d^{11}_k$—the least important bits of the data (the class II portion) which is associated with the particular packet k and which is intended to be transmitted across the communications network with use thereof. In addition, however, and in accordance with the third illustrative embodiment of the present invention, additional payload information 64 comprising data $d^1_{k-w}$, which consists of the bits from the class I portion of the data associated with previously transmitted data packet k−w is appended to data packet k immediately after payload information 62 and 63.

Similarly, data packet k+w comprises control information 65, followed by payload information 66 and 67. Payload information 66 comprises data $d^1_{k+w}$—the class I portion of the data which is associated with the particular packet k+w and which is intended to be transmitted across the communications network with use thereof, and payload information 67 comprises data $d^{11}_{k+w}$—the class II portion of the data which is associated with the particular packet k+w and which is intended to be transmitted across the communications network with use thereof Again, however, and in accordance with the third illustrative embodiment of the present invention, additional payload information 62 comprising data $d^1_k$, which consists of the class I portion of the data associated with data packet k, is repeated and appended to data packet k+w immediately after payload information 66 and 67.

Note that with use of the third illustrative embodiment of the present invention employing error sensitivity classification, graceful degradation is also advantageously achieved. However, the overhead is advantageously reduced significantly, as compared, for example, to the prior art technique of Schuster et al. Note also that the bits in the class II portion (which are not repeated) rely only on error mitigation, familiar to those skilled in the art, in the case of packet loss.

Although this third illustrative embodiment has been described with reference to two classes of error sensitivity, generalizations of the present inventive technique to illustrative embodiments in which the bits are classified into more than two such classes will be obvious to those of ordinary skill in the art. In such cases, one or more of these classes may be advantageously delayed and repeated in accordance with the principles of the present invention.

A Fourth Illustrative Embodiment

FIG. 7 shows an illustrative sequence of transmitted data packets in accordance with a fourth illustrative embodiment of the present invention employing embedded coding techniques having separate core and enhancement coding layers. Like multidescriptive coding techniques, embedded coding techniques are familiar to those of ordinary skill in the art. (See, e.g., U.S. patent application Ser. No. 09/280280, referenced above.) Embedded coders encode the source signal into core and enhancement bits. Reconstruction of the original signal by a decoder from the core bits alone will guarantee a basic signal quality, while the inclusion of the enhancement bits in the decoding process will improve the signal quality. The enhancement bits are typically not decodable by themselves (i.e., without the core bits). When such a core and enhancement type of source code is available, the principles of the present invention may be advantageously combined therewith, resulting in the fourth illustrative embodiment of the present invention. Specifically, in accordance with the fourth illustrative embodiment, the enhancement bits are not repeated, while the core bits are multidescriptively coded and transmitted in a multistrean format in a similar manner to the second illustrative embodiment described above and illustratively shown in FIG. 4.

With reference to FIG. 7, note again that data packets k and k+w are explicitly shown. Data packet k comprises control information 71, followed by payload information 72 and 73. Payload information 72 comprises data $c^{(1)}_k$—the data from the first of the two multidescriptive bit streams encoding the core bits of the data which is associated with the particular packet k and which is intended to be transmitted across the communications network with use thereof; and payload information 73 comprises data $e_k$—the enhancement bits of the data which is associated with the particular packet k and which is intended to be transmitted across the communications network with use thereof. In addition, however, and in accordance with the fourth illustrative embodiment of the present invention, additional payload information 74 comprising data $c^{(2)}_{k-w}$, which consists of the data from the second of the two multidescriptive bit streams encoding the core bits of the data associated with previously transmitted data packet k−w, is appended to data packet k immediately after payload information 72 and 73.

Similarly, data packet k+w comprises control information 75, followed by payload information 76 and 77. Payload information 76 comprises data $c^{(1)}_{k-w}$—the data from the first of the two multidescriptive bit streams encoding the core bits of the data which is associated with the particular packet k+w, and which is intended to be transmitted across the communications network with use thereof, and payload information 77 comprises data $e_{k+w}$—the enhancement bits of the data which is associated with the particular packet k+w and which is intended to be transmitted across the communications network with use thereof. Again, however, and in accordance with the fourth illustrative embodiment of the present invention, additional payload information 78 comprising data $c^{(2)}_k$, which consists of the data from the second of the two multidescriptive bit streams encoding the core bits of the data associated with data packet k, is appended to data packet k+w immediately after payload information 76 and 77.

Note that with use of the fourth illustrative embodiment of the present invention employing embedded coding techniques, graceful degradation is also advantageously achieved. And the overhead is also advantageously reduced as compared, for example, to the prior art technique of Schuster et al. Note also that the scheme advantageously relies on error mitigation techniques, familiar to those skilled in the art, only for packet loss with respect to the enhancement bits.

It will be obvious to those of ordinary skill in the art that several variations of this fourth illustrative embodiment may be advantageously employed. For example, the enhancement bits may also be encoded and transmitted in a two (or more) version multidescriptive manner. Alternatively, the core bits may be merely repeated (rather than multidescriptively encoded), and the enhancement bits may or may not be multidescriptively encoded, all in accordance with the principles of the present invention.

Other Illustrative Embodiments

In accordance with certain other illustrative embodiments of the present invention, multiple copies of the "repeated" payload information (or in the case of, for example, multidescriptive or embedded encoding techniques, payload information representative of the same signal segment as a previously transmitted segment) may be spread out over several packets. For example, the first illustrative embodiment described above, in which the payload information associated with data packet k is repeated and appended to data packet k+w), may be modified so as to further repeat and append the same additional payload information to data packets k+2w and k+3w, for example. In this manner, longer intervals of packet loss bursts (e.g., up to a loss of 3w; consecutive data packets in the instant example) can be corrected, while nonetheless advantageously providing for the same relatively fast low delay recovery for shorter-length packet loss bursts (e.g. those consisting of at most w packets). In addition, multidescriptive "versions" of this approach employing multiple "repetitions" of payload information may also be employed, wherein, for example, $d^{(2)}_k$ may be provided as additional payload information in data packets k+w and k+3w, whereas $d^{(1)}_k$ is repeated as additional payload information in data packet k+2w.

In accordance with yet other illustrative embodiments of the present invention, the techniques of the present invention may also be applied to a progressive coder, also familiar to those of ordinary skill in the art. For example, in the progressive image coder known as the SPIHT coder as described in A. Said el al., "A New Fast and Efficient Image Codec Based on Set Partitioning (in Hierarchical Trees," IEEE Trans. on Circuits and Systems for Video Technology, vol. 6, June 1996, the image is encoded into a bit stream of decreasing importance. The important information can be used at the decoder to reconstruct a signal having a certain basic signal quality, while the inclusion of the less important bits signal improve the decoded signal quality. Note, however, that this is different from tile technique of multidescriptive coding, because the less important bits are not decodable by themselves (as is the second of the two multidescriptive bit streams in a typical multidescriptive coder).

In the SPIHT coder, for example, the most important information bits are contained at the beginning of the bit stream. As more bits in the bit stream are received and processed, the decoded image quality improves. Thus, in accordance with such an illustrative embodiment of the present invention, the number of bits which are duplicated and transmitted is advantageously scalable, depending on the quality desired at the receiver illustrative the event of packet loss.

And in accordance with still other illustrative embodiments of the present invention, network feedback based error correction techniques may be advantageously combined with the principles of the present invention. Although forward error correction techniques such as the method of the present invention operate quite differently than do feedback based approaches using, for example. Automatic Repeat reQuest (ARQ) protocols (familiar to those of ordinary skill in the art), the concepts of the present invention may nonetheless be advantageously combined with ARQ protocols when feedback is available in the network (such as, for example, with IP)/UDP/RCP type protocols, familiar to those skilled in tile art). In particular, and particularly when the network condition is not changing rapidly, the available feedback information may be advantageously used in accordance with such an illustrative embodiment of the present invention to control and adapt the parameters of the "delay and repeat" type methods illustrative of tile present invention. For example, if the burst length, based on the received feedback information, is relatively long, then the amount of delay employed in accordance with such an illustrative embodiment of present invention might advantageously be made proportionately larger (at the expense of longer decoding delays at the receiver). On the other hand, if the network is particularly congested, the quantity of repeated bits might be advantageously reduced in a scalable coder such as an embedded or progressive source coder (at the expense of a relatively poorer decoded signal quality). Many other variations of such illustrative embodiments of the present invention which make use of available network feedback information will be obvious to those of ordinary skill in the art based on the complete contents of the instant disclosure.

Addendum to the Detailed Description

The preceding merely illustrates the principles of the invention. It will thus be appreciated that those skilled in the art will be able to devise various arrangements which, although not explicitly described or shown herein, embody the principles of the invention and are included within its spirit and scope. Furthermore, all examples and conditional language recited herein are principally intended expressly to be only for pedagogical purposes to aid the reader in understanding the principles of the invention and the concepts contributed by the inventors to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future—i.e., any elements developed that perform the same function, regardless of structure.

Thus, for example, it will be appreciated by those skilled in the art that the block diagrams herein represent conceptual views of illustrative circuitry embodying the principles of the invention. Similarly, it will be appreciated that any flow charts, flow diagrams, state transition diagrams, pseudocode, and the like represent various processes which may be substantially represented in computer readable medium and so executed by a computer or processor, whether or not such computer or processor is explicitly shown.

The functions of the various elements shown in the figures, including functional blocks labeled as "processors" may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, read-only memory (ROM) for storing software, random access memory (RAM), and non-volatile storage. Other hardware, conventional and/or custom, may also be included. Similarly, any switches shown in the FIGS. are conceptual only. Their function may be carried out through the operation of program logic, through dedicated logic, through the interaction of program control and dedicated logic, or even manually, the particular technique being selectable by the implementor as more specifically understood from the context.

In the claims hereof any element expressed as a means for performing a specified function is intended to encompass any way of performing that function including, for example, (a) a combination of circuit elements which performs that function or (b) software in any form, including, therefore, firmware, microcode or the like, combined with appropriate circuitry for executing that software to perform the function. The invention as defined by such claims resides in the fact that the functionalities provided by the various recited means are combined and brought together in the manner which the claims call for. Applicant thus regards any means which can provide those functionalities as equivalent (within the meaning of that term as used in 35 U.S.C. 112, paragraph 6) to those explicitly shown and described herein.

What is claimed is:

1. A method of coding a sequence of data packets representing a stream of information, the data packets to be transmitted across a communications network, each data packet comprising a set of payload information representative of a segment of said stream of information corresponding thereto, the method comprising the steps of:

(a) coding for transmission a first data packet, said encoded first data packet comprising a first set of payload information representative of a first segment of said stream of information; and (b) coding for transmission a second data packet subsequent to said first data packet in said sequence of data packets, said encoded second data packet comprising a second set of payload information representative of a second segment of said stream of information subsequent to said first segment of said stream of information, said encoded second data packet further comprising an additional set of payload information, said additional set of payload information also representative of said first segment of said stream of information but not representative of other segments of said stream of information, wherein said additional set of payload information and said first set of payload information comprise redundant encodings of said first segment of said stream of information, wherein an approximated reconstruction of said first segment of said stream of information is producible based on a decoding of said first set of payload information alone, and wherein an approximated reconstruction of said first segment of said stream of information is producible based on a decoding of said additional set of payload information alone.

2. The method of claim 1 wherein said additional set of payload information and said first set of payload information are identical.

3. The method of claim 1 wherein said first set of payload information comprises a first portion and a second portion thereof, and wherein said additional set of payload information is identical to said first portion of said first set of payload information.

4. The method of claim 1 wherein said first set of payload information and said additional set of payload information comprise different representations of said first segment of said stream of information.

5. The method of claim 1 wherein said first set of payload information comprises a first portion and a second portion thereof, and wherein said additional set of payload information and said first portion of said first set of payload information comprise different representations of a subset of said first segment of said stream of information.

6. The method of claim 1 wherein said first data packet and said second data packet are separated in said sequence of data packets by a number of other data packets, the method further comprising the step of:

(d) receiving feedback information from said communication is network, said feedback information reflecting data packet loss information, wherein said number of other data packets which separate said first data packet and said second data packet is based at least in part on said feedback information.

7. A method of decoding a received sequence of encoded data packets, the received sequence of encoded data packets being a subset of a transmitted sequence of encoded data packets, each of said encoded data packets in said transmitted sequence comprising a corresponding one of an original sequence of data packets having been encoded and transmitted across a communications network, the original sequence of data packets representing a continuous stream of information, each of the data packets in said original sequence comprising a set of payload information representative of a segment of said stream of information corresponding thereto, the original sequence of data packets having been encoded by:

(i) coding a first data packet, the encoded first data packet comprising a first set of payload information representative of a first segment of said stream of information; and (ii) coding a second data packet subsequent to said first data packet in said original sequence for transmission, said encoded second data of comprising second set of payload information representative of a second segment of said stream of information subsequent to said first segment of said stream of information, said encoded second data packet further comprising an additional set of payload information, said additional set of payload information also representative of said first segment of said stream of information, but not representative of other segments of said stream of information, said received sequence of encoded data packets not including the encoded first data packet, the decoding method comprising the steps of:

(a) generating a reproduction of said second segment of said stream of information based on said second set of payload information comprised in said encoded second data packet; and (b) generating a reproduction of said first segment of said stream of information based on said additional set of payload information comprised in said encoded second data packet.

8. The method of claim 7 wherein said additional set of payload information and said first set of payload information are identical.

9. The method of claim 7 wherein said first set of payload information comprises a first portion and a second portion thereof, and wherein said additional set of payload information is identical to said first portion of said first set of payload information.

10. The method of claim 7 wherein said first set of payload information and said additional set of payload information comprise different representations of said first segment of said stream of information.

11. The method of claim 7 wherein said first set of payload information comprises a first portion and a second portion thereof, and wherein said additional set of payload information and said first portion of said first set of payload information comprise different representations of a subset of said first segment of said stream of information.

12. An apparatus for encoding a sequence of data packets representing a stream of information, the data packets to be transmitted across a communications network, each data packet comprising a set of payload information representative of a segment of said stream of information corresponding thereto, the encoder comprising:

a coder adapted to code for transmission a first data packet, said encoded first data packet comprising a first set of payload information representative of a first segment of said stream of information; and a coder adapted to code for transmission a second data packet subsequent to said first data packet in said sequence of data packets, said encoded second data packet compromising a second set of payload information representative of a second segment of said stream of information subsequent to said first segment of said stream of information, said encoded second data packet further comprising an additional set of payload information, said additional set of payload information also representative of said first segment of said stream of information but not representative of other segments of said stream of information, wherein said additional set of payload information and said first set of payload information comprise redundant encodings of said first segment of said stream of information, wherein an approximated reconstruction of said first segment of said stream of information is producible based on a decoding of said first set of payload information alone, and wherein all approximated reconstruction of said first segment of said stream of information is producible based on a decoding said additional set of payload information alone.

13. The apparatus of claim 12 wherein said additional set of payload information and said first set of payload information are identical.

14. The apparatus of claim 12 wherein said first set of payload information comprises a first portion and a second portion thereof, and wherein said additional set of payload information is identical to said first portion of said first set of payload information.

15. The apparatus of claim 12 wherein said first set of payload information and said additional set of payload information comprise different representations of said first segment of said stream of information.

16. The apparatus of claim 12 wherein said first set of payload information comprises a first portion and a second portion thereof, and wherein said additional set of payload information and said first portion of said first set of payload information comprise different representations of a subset of said first segment of said stream of information.

17. The apparatus of claim 12 wherein said first data packet and said second data placket are separated in said sequence of data packets by a number of other data packets, the encoder further comprising:

a receiver adapted to receive feedback information from said communications network, said feedback information reflecting data packet loss information, wherein said number of other data packets which separate said first data packet and said second data packet is based at least in part on said feedback information.

18. An apparatus for decoding a received sequence of encoded data packets, the received sequence of encoded data packets being a subset of a transmitted sequence of encoded data packets, each of said encoded data packets in said transmitted sequence comprising a corresponding one of an original sequence of data packets having been encoded and transmitted across a communications network, the original sequence of data packets representing a continuous stream of information, each of the data packets in said original sequence comprising a set of payload information representative of a segment of said stream of information corresponding thereto, the original sequence of data packets having been encoded by:

(i) coding a first data packet, the encoded first data packet comprising a first set of payload information representative of a first segment of said stream of information; and (ii) coding a second data packet subsequent to said first data packet in said original sequence for transmission, said encoded second data packet comprising a second set of payload information representative of a second segment of said stream of information subsequent to said first segment of said stream of information, said encoded second data packet further comprising an additional set of payload information, said additional set of payload information also representative of said first segment of said stream of information, but not representative of other segments of said stream of information, said received sequence of encoded data packets not including the encoded first data packet the apparatus comprising:

a decoder adapted to generate a reproduction of said second segment of said stream of information based on said second set of payload information comprised in said encoded second data packet; and a decoder adapted to generate a reproduction of said first segment of said stream of information based on said additional set of payload information comprised in said encoded second data packet.

19. The apparatus of claim 18 wherein said additional set of payload information and said first set of payload information are identical.

20. The apparatus of claim 18 wherein said first set of payload information comprises a first portion and a second portion thereof, and wherein said additional set of payload information is identical to said first portion of said first set of payload information.

21. The apparatus of claim 18 wherein said first set of payload information and said additional set of payload information comprise different representations of said first segment of said stream of information.

22. The apparatus of claim 18 wherein said first set of payload information comprises a first portion and a second portion thereof, and wherein said additional set of payload information and said first portion of said first set of payload information comprise different representations of said first segment of said stream of information.

* * * * *